US006990474B2

(12) United States Patent
Woods et al.

(10) Patent No.: US 6,990,474 B2
(45) Date of Patent: Jan. 24, 2006

(54) EVALUATION SYSTEM

(75) Inventors: Mark J. Woods, Bristol (GB); James R. Hewit, Newport on Tay (GB)

(73) Assignee: NCR Corporation, Dayton, OH (US)

( * ) Notice: Subject to any disclaimer, the term of this patent is extended or adjusted under 35 U.S.C. 154(b) by 729 days.

(21) Appl. No.: 09/943,161

(22) Filed: Aug. 30, 2001

(65) Prior Publication Data

US 2002/0043560 A1 Apr. 18, 2002

(30) Foreign Application Priority Data

Sep. 8, 2000 (GB) .................................. 0022180

(51) Int. Cl.
*G06F 9/44* (2006.01)

(52) U.S. Cl. .......................................................... 706/1

(58) Field of Classification Search ............... 706/1–10
See application file for complete search history.

(56) References Cited

U.S. PATENT DOCUMENTS

| | | | | |
|---|---|---|---|---|
| 5,210,704 | A * | 5/1993 | Husseiny | 702/34 |
| 5,544,256 | A * | 8/1996 | Brecher et al. | 382/149 |
| 5,619,620 | A * | 4/1997 | Eccles | 706/20 |
| 5,842,194 | A * | 11/1998 | Arbuckle | 706/52 |
| 6,590,519 | B2 * | 7/2003 | Miceli et al. | 342/22 |

FOREIGN PATENT DOCUMENTS

EP 0881603 12/1998

OTHER PUBLICATIONS

A high performance fuzzy inference processor and its evaluation system Nitta Fuzzy Systems, 1995. International Joint Conference of the Fourth IEEE International Conference on Fuzzy Systems vol. 3, Mar. 1995, pps. 1613-1620.*

IEEE Transactions on Nueral Networks, vol. 9. No. 5, (1998), M. Meneganti et al., "Fuzzy Neural Networks for Classification and Detection of Anomalties".*

Proceeding of the 1996 IEEE International Symposioum on Intelligent Control, (1996), B. Chen et al., "Machine Vision Fuxxy Object Recognition and Inspection Using a New Fuzzy Neural Network".*

IEEE Transaction on Neural Networks, vol. 9, No. 5, Sep. 1998, M Meneganti et al, "Fuzzy Neural Networks for Classification and Detection of Anomalies".

Proceedings of the 1996 IEEE International Symposium on Intelligent Control, Dearborn MI, Sep. 15-18, 1996, B Chen et al, "Machine Vision Fuzzy Object Recognition and Inspection using a New Fuzzy Neural Network".

* cited by examiner

*Primary Examiner*—Anthony Knight
*Assistant Examiner*—Michael B. Holmes
(74) *Attorney, Agent, or Firm*—Michael Chan

(57) ABSTRACT

An evaluation system (10) for evaluating media is described. The system is particularly suitable for evaluating banknotes to determine their suitability for use in an ATM. The system comprises sensing means (12) for sensing properties of media (18) including the location of any imperfection in the media, and an evaluation module (16) for evaluating imperfections in the media(18). The evaluation module (16) includes a classifier (52) comprising an artificial neural network (60) and fuzzy logic (66). The evaluation module (16) may include a plurality of classifiers (52), and a second level classifier (56) for generating a suitability index (20) from the outputs of the first level classifiers (52). A method of evaluating media is also described.

10 Claims, 17 Drawing Sheets

FIG. 5

| ANTECEDENT | CONSEQUENT | CF | W |
|---|---|---|---|
| IF LIMPNESS IS ZERO THEN | DI IS ZERO | 1.0 | 0.0 |
| IF LIMPNESS LOW THEN | DI IS LOW | 1.0 | 0.2 |
| IF LIMPNESS MEDIUM THEN | DI IS HIGH | 1.0 | 0.7 |
| IF LIMPNESS HIGH THEN | DI IS HIGH | 0.4 | 0.9 |
| IF LIMPNESS HIGH THEN | DI IS CRITICAL | 0.6 | |
| IF LIMPNESS CRITICAL | DI IS CRITICAL | 1.0 | 1.0 |

CF = CONFIDENCE FACTOR AND W = WEIGHT

EVALUATION SYSTEM

BACKGROUND OF THE INVENTION

The present invention relates to an evaluation system. In particular, the invention relates to an evaluation system for evaluating media, such as banknotes, for use in a self-service terminal (SST), such as an automated teller machine (ATM).

Banknotes are subject to damage and degradation during use. This may result in a banknote having one or more physical imperfections. Typical physical imperfections include: voids (areas of a banknote that are missing, such as pin holes), attachments (such as staples, adhesive tape, and paper clips), flaps (part of a banknote folded back on itself), tears (a break in the continuity of the banknote's fiber structure), and limpness (degradation of the banknote's structure caused by broken or damaged fibers).

As a result of some banknotes having physical imperfections, not all banknotes are suitable for use in an ATM. The only banknotes that are suitable are those banknotes that:

(1) can be picked and transported by an ATM without impairing the operation of the ATM or damaging the banknote, and (2) are cosmetically acceptable to a user of an ATM.

A banknote having one or more physical imperfections may cause a banknote dispenser within an ATM to jam while the banknote is being picked or transported. This jam may put the ATM out of operation until a maintenance engineer has cleared the jam. Thus, before a banknote can be used in an ATM it has to be evaluated in a process typically referred to as condition screening.

Even if a banknote can be picked and transported acceptably by an ATM, it may not be acceptable if it is, for example, too limp or too porous, as a user of the ATM may not wish to receive such a banknote.

As a result of condition screening, every unsuitable banknote is rejected so that only suitable banknotes are loaded into an ATM.

At present, low cost condition screening systems are available, but these are not very effective or reliable. Very high cost condition screening systems are also available, but these systems are so expensive that it is only economic to use them in large currency centers. As a result, it is common for condition screening to be performed manually.

Manual condition screening has the advantage that an experienced evaluator can assess the quality of a banknote based on the extent and the location of any imperfection in the banknote. However, manual screening has disadvantages, including, lack of inconsistency in evaluating each banknote, the possibility of human error, and the high cost of performing the evaluation.

SUMMARY OF THE INVENTION

It is among the objects of an embodiment of the present invention to obviate or mitigate the above or other disadvantages associated with known evaluation systems.

According to a first aspect of the present invention there is provided an evaluation system for evaluating media, the system comprising sensing means for sensing properties of media including the location of any imperfection in the media, and an evaluation module for evaluating imperfections in the media, the evaluation module comprising an artificial neural network and a fuzzy system.

A fuzzy system is a system that receives discrete inputs; fuzzifies and categorizes these discrete inputs; interrogates a set of fuzzy rules to produce an appropriate fuzzy output set; and defuzzifies the output set to produce a discrete output.

The word "media" is used herein in a generic sense to denote one or more items, documents, or such like; in particular, the word "media" when used herein does not necessarily relate exclusively to multiple items or documents. Thus, the word "media" may be used to refer to a single item (rather than using the word "medium") and/or to multiple items.

Preferably, the evaluation module includes a classifier comprising: first evaluating means for evaluating any imperfections in one or more predefined critical locations on the media and generating a first damage value, second evaluating means for evaluating any imperfections in any non-critical locations on the media and generating a second damage value, and combining means for combining the first and second damage values to generate a single damage index.

Preferably, the system includes a plurality of classifiers, and a second level classifier for receiving the single damage index from each classifier and for generating a suitability index therefrom.

Thus, in one embodiment, the single damage index may be used as a measure of how suitable the media is for use in an automated machine. In another embodiment, the single damage index may relate to one type of imperfection and may be combined (by the second level classifier) with other single damage indices relating to other types of imperfections to provide a measure of how suitable the media is for use in an automated machine.

Preferably, the first evaluating means is implemented by a fuzzy system, and the second evaluating means is implemented by an artificial neural network. In a preferred embodiment the artificial neural network is a multi-layered perceptron (MLP) neural network.

The predefined critical locations may be the areas on the media that are in the vicinity (for example, within 3 cm) of a vacuum pick point in an ATM dispenser using vacuum picking. Any imperfections in these areas would greatly hinder the vacuum pick operation. Alternatively, predefined critical locations may be the areas on the media that are in the vicinity of a friction pick point in an ATM dispenser using friction picking.

This aspect of the present invention is particularly advantageous when used with banknotes for dispensing from an ATM. This is because it enables a neural network to be used for evaluating the imperfections over the majority of the media's surface, and neural networks are efficient at handling a large number of inputs. This aspect also enables fuzzy logic to be used for evaluating imperfections in small localized areas. The combination of the neural network and the fuzzy logic is equivalent to adjusting the neural network so that it responds to particular localized situations in a pre-defined way, without requiring extensive training of the neural network.

According to a second aspect of the invention there is provided a method of evaluating media, the method comprising the steps of: sensing properties of media including the location of any imperfection in the media, evaluating any imperfections in one or more predefined critical locations on the media, generating a first damage value based on the imperfections in the critical locations, evaluating any imperfections in any non-critical locations on the media, generating a second damage value based on the imperfections in the non-critical locations, and combining the first and second damage values to generate a single damage index.

According to a third aspect of the invention there is provided an evaluation module for coupling to a sensing means, the evaluation module including a classifier comprising the first and second evaluating means and the combining means of the first aspect of the invention.

The evaluation module may be implemented in software.

By virtue of this aspect of the invention an evaluation module is provided that is operable to receive inputs relating to imperfections on a media and to evaluate how suitable that media is for use in an ATM.

According to a fourth aspect of the invention there is provided an evaluation module for coupling to a sensing means, the evaluation module including evaluating means comprising an artificial neural network and a fuzzy system.

According to a fifth aspect of the invention there is provided a method of evaluating media, the method comprising the steps of: sensing the media, detecting one or more physical imperfections in the media, determining properties of each of the imperfections in the media, generating a damage index associated with each imperfection based on the determined properties, and generating a single suitability index based on a combination of each damage index.

Where there is only one imperfection, there is only one damage index, and the suitability index may be identical to the damage index. Where there are multiple imperfections, the suitability index is a combination of each damage index, and the combination function may be implemented by a fuzzy system.

BRIEF DESCRIPTION OF THE DRAWINGS

These and other aspects of the invention will be apparent from the following specific description, given by way of example, with reference to the accompanying drawings, in which:

FIG. 5 details the accompanying rule base for the term sets of FIG. 4;

DETAILED DESCRIPTION

Figure 1:
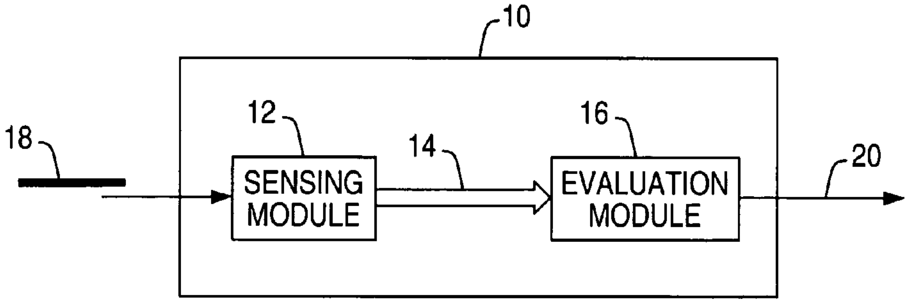
FIG. 1 is a block diagram of an evaluation system according to one embodiment of the present invention.

Reference is now made to FIG. 1, which is a block diagram of an evaluation system 10. System 10 comprises sensing means 12 coupled by a properties output line 14 to an evaluation module 16. The sensing means 12 is in the form of a sensing module for sensing properties of media 18 in the form of banknotes. The evaluation module 16 provides a single output 20 (a suitability index) for indicating the suitability of the media 18 for use in an ATM.

Figure 2:
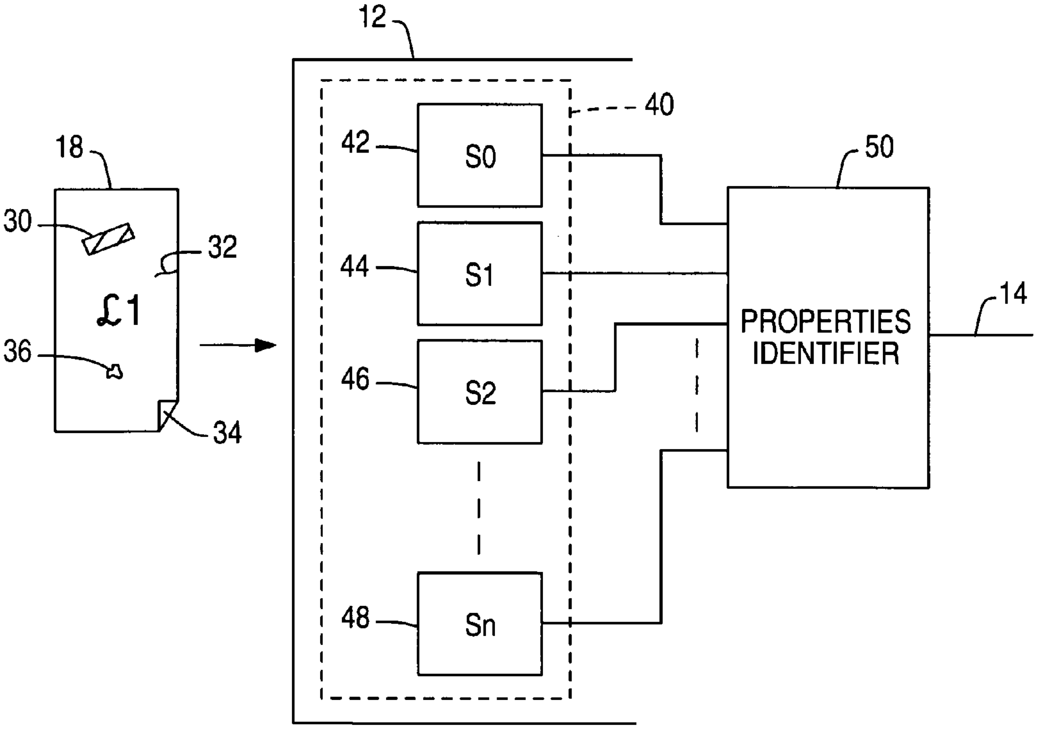
FIG. 2 is a schematic diagram of a banknote entering a sensing module of the system of FIG. 1.

The sensing module 12 receives a banknote 18 at its input and examines the banknote 18. FIG. 2 shows a banknote 18 having a number of different imperfections, including: an attachment (adhesive tape stuck on the banknote surface) 30, a tear 32, a flap 34, and a void (a hole) 36. The banknote 18 is shown entering the sensing module 12. Sensing module 12 includes an array of sensors 40 for measuring various properties associated with the imperfections.

In this embodiment, attachments, voids, and flaps are treated as one type of imperfection, and are detected by a note thickness sensor 42 for measuring the banknote thickness across the entire length of the banknote, a transmitted light imaging sensor 44, and a reflected light imaging sensor 46. These sensors 42 to 46 are also used to detect the limpness of the banknote. Additional sensors include a porosity sensor 48 which is also used to determine the limpness of the banknote 18. Other sensors may also be used.

The sensing module 12 also includes a properties identifier 50 for collating the data output from the sensors 40 and generating information relating to properties of the imperfections in the banknote 18, as will be described in more detail below. The properties identifier 50 is typically an algorithm having appropriate feature extraction routines that operate on the sensor outputs to generate properties data for properties output line 14.

For each imperfection, the evaluation module 16 receives associated properties data from the sensing module 12 via properties line 14. The evaluation module 16 then generates a single damage index for that imperfection. The damage index is a number (between zero and one) that represents the potential problem posed by that imperfection, with one being the highest threat and zero being the lowest threat. The evaluation module 16 uses either an artificial neural network (ANN), a fuzzy system, or a combination of ANN and a fuzzy system to generate a damage index from the properties data. The evaluation module 16 then combines the individual damage indices into a single suitability index (a global damage index) that represents the suitability of the banknote 18 being used in an ATM. This is illustrated in FIG. 3.

Figure 3:
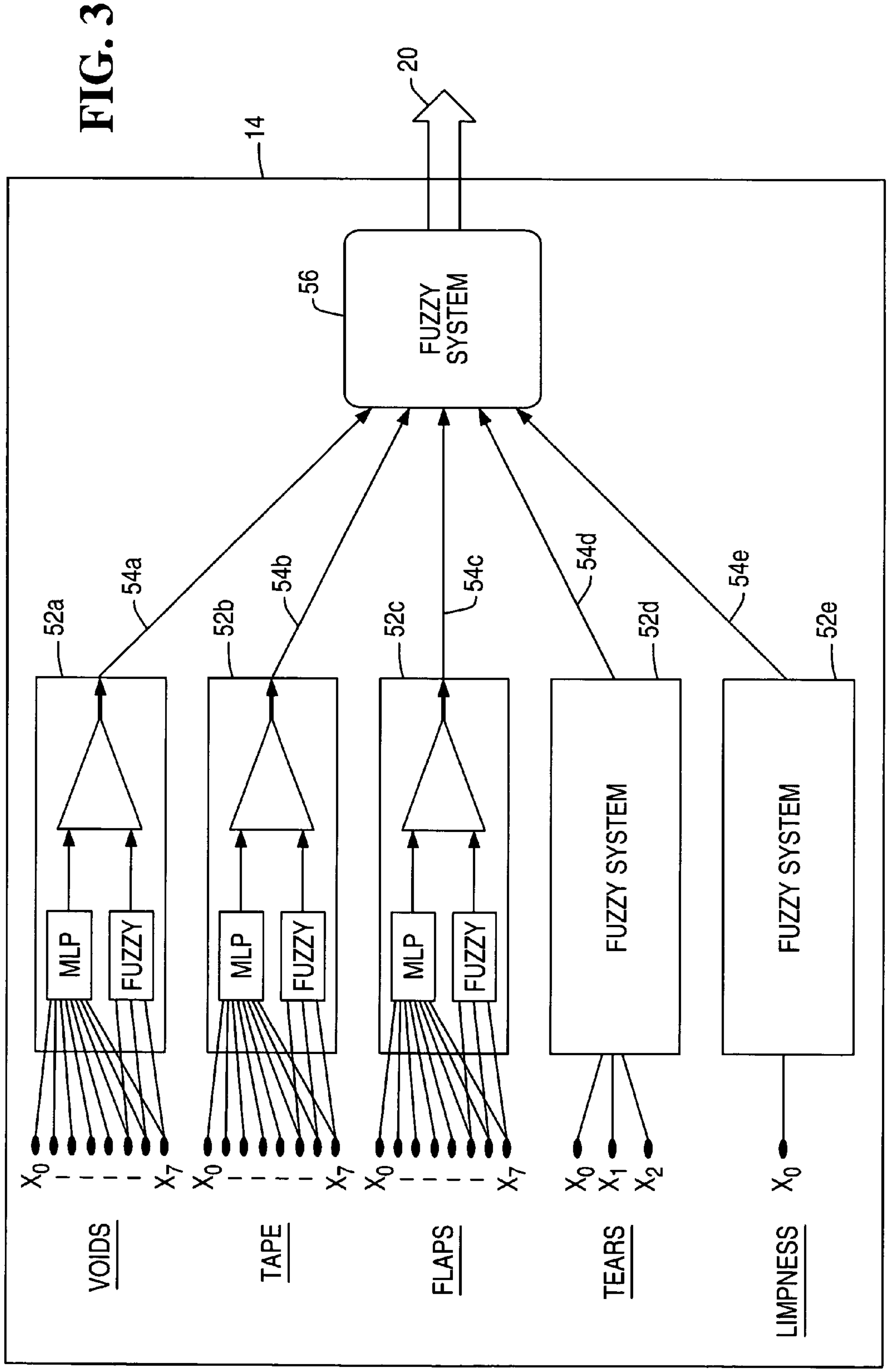
FIG. 3 is a block diagram of an evaluation module of the system of FIG. 1.

FIG. 3 is a block diagram of the evaluation module 14. Module 14 includes five first level computing classifiers 52*a* to 52*e*. Each classifier 52 generates a damage index 54*a* to 54*e* from one or more inputs. A second level computing classifier 56 receives each of the damage indices and generates a single suitability index 20 therefrom. First level classifiers 54*a* to 54*c* comprise a combination of ANN and a fuzzy system; whereas first level classifiers 54*d* and 54*e* comprise only a fuzzy system.

First level classifiers 52*a* to 52*c* each receive eight inputs; first level classifier 52*d* receives three inputs; and first level classifier 52*e* only receives one input. This is because of the different imperfections evaluated by the first level classifiers 52, as will now be described in more detail.

Some imperfections can be classified by a single property, other imperfections require three or more properties to classify them correctly. Those imperfections that can be classified using a small number of properties (for example, less than four) are suitable for use in a fuzzy logic system; whereas, those imperfections that require a large number of properties (for example, more than four) are more suitable for inputting to an artificial neural network. Each of the imperfections will now be described in more detail.

Limpness

Figure 4:
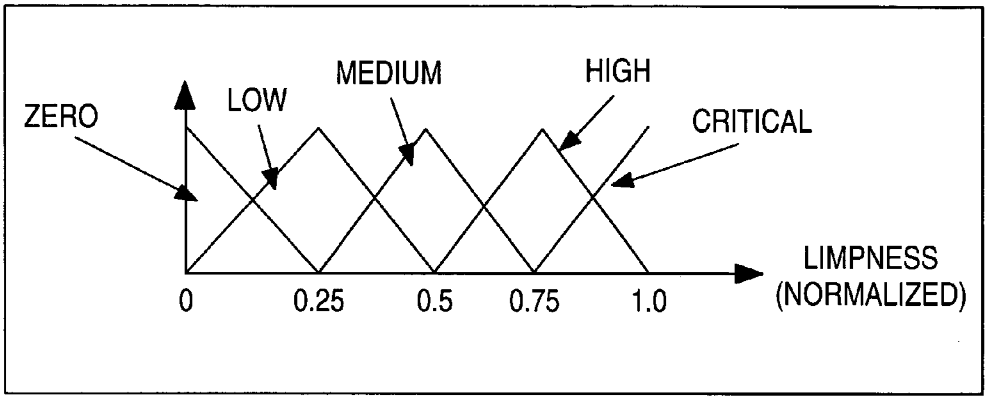
FIG. 4 shows fizzy logic term sets for input and output variables relating banknote limpness to damage index.
Figure 4:
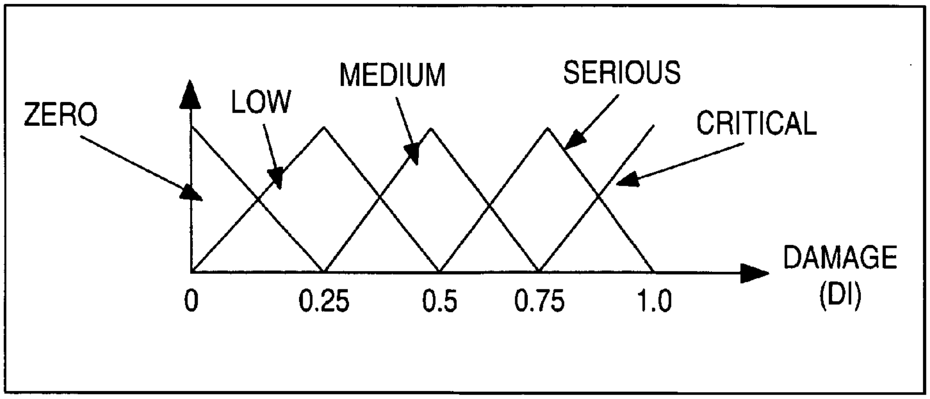

Limpness can be classified to a large extent by a single property, namely the porosity of the banknote 18. Due to the low dimensionality of the input space (a single property) and a difficulty in assigning precise thresholds to various limpness levels, a fuzzy logic system is ideally suited to this task as it can be easily initialized with a priori expert instructions. FIG. 4 shows the term sets for the input and output variables and FIG. 5 details the accompanying rule base. Thus, first level classifier 52*e* only requires one input (porosity).

Tears

Three properties are required to classify tears, namely: x location, y location, and dimension (size) of the tear. The damage associated with a tear tends to be greater if one of its end points coincides with, or is close to, the outside edge of the banknote. This is because there is a greater likelihood of the banknote edge being caught in an ATM's transport guides. Damage is also directly proportional to the size of a tear.

Figure 6:
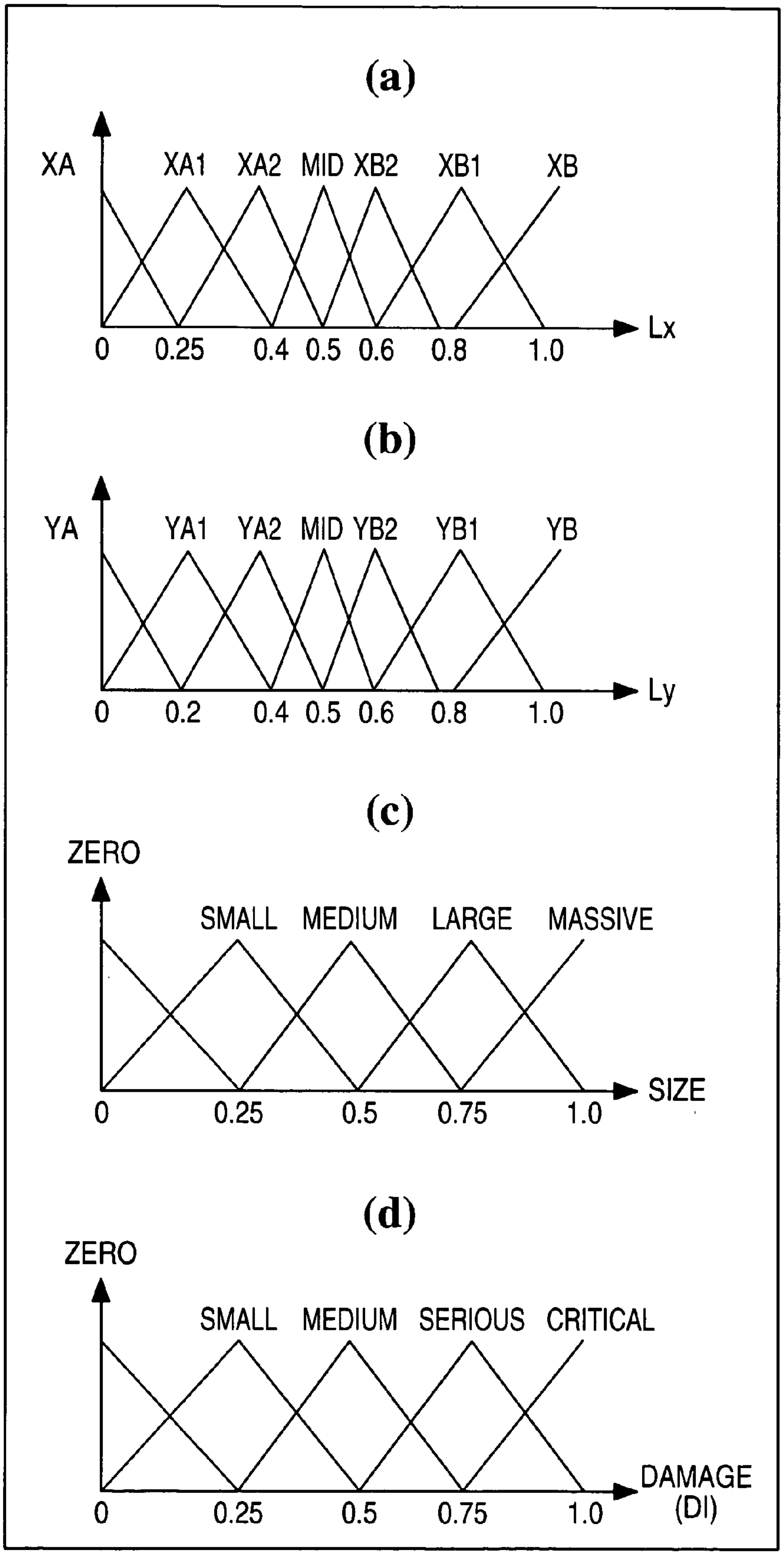
FIG. 6 shows fuzzy logic term sets for three input and one output variables relating a banknote tear to damage index.

Again, as with limpness, a small input dimension is involved (there are only three properties), and a manual operator can describe the input/output relationship using abstract, linguistic terms. As the terms are vague and imprecise, a fuzzy system provides an appropriate means of implementing the model, FIG. 6 shows term sets for the four variables involved (x location, y location, dimension, and damage index). Thus, first level classifier 52*d* requires three inputs (x location, y location, and dimension)

Voids, Flaps, and Attachments

As mentioned above, voids, flaps, and attachments are treated as one type of imperfection in this embodiment. This is because there are very close similarities between the mappings which relate voids, tape and flaps to their respective damage measures. The properties used to describe all of these imperfections are: shape, rotation, dimension, location on x axis, and location on y axis.

The size of the input space (five properties) and complexities in the imperfection to damage index relationships make it difficult to implement the required transformations efficiently using fuzzy logic.

In addition, the shape property is sub-divided into four sub-properties: regular, small protruding lip, medium protruding lip, and large protruding lip. Thus, the shape sub-properties relate to the extent of any protrusion. This is because it is the size of any lip present in the void, flap, or attachment that causes problems in transporting a note, not the shape of the void, flap, or attachment itself.

This sub-division provides more information about the shape and simplifies the training and recognition process. This sub-division also permits sub-properties to be defined with fuzzy membership functions so that a set of ANNs can be used to do the classification. A set of outputs are provided showing to what degree a shape possesses each of the target features.

Figure 7:
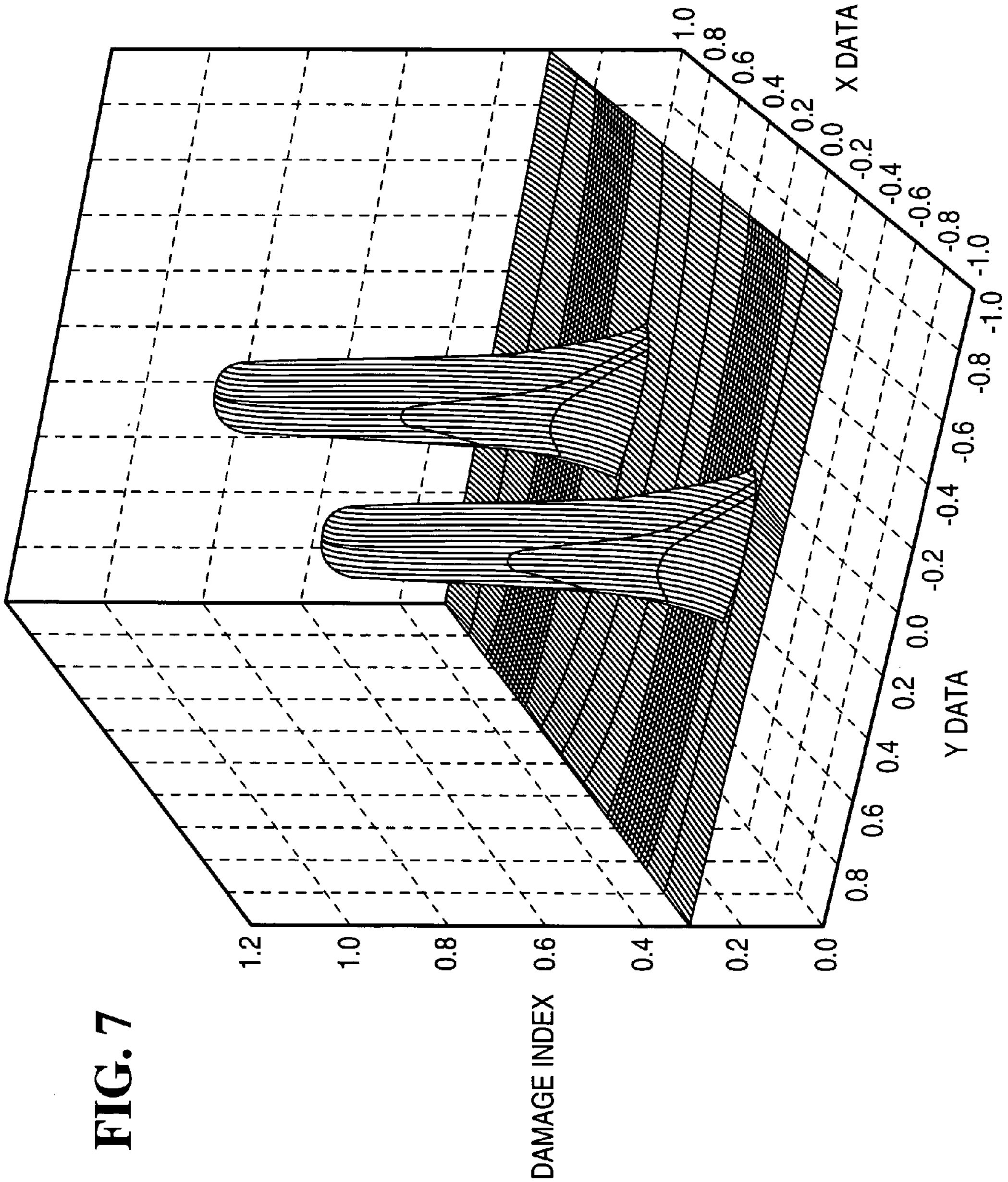
FIG. 7 shows a desired mapping of damage index versus x co-ordinate and y co-ordinate positions for a void type of imperfection.

It is a complex task to generate a damage index representing a void, flap, or attachment imperfection. FIG. 7 shows a desired mapping of damage index versus x co-ordinate (Lx) and y co-ordinate (Ly) positions for a void having a regular shape (that is, no protruding lip), a rotation of 0° C., and a normalized dimension of 0.25. As with tears, the damage is greater on the periphery than in the center. The two sharp peaks in damage index are located in areas corresponding to the vacuum pick points, that is, the points at which suction cups on a pick module contact the banknote. Any poor connection caused by a void, flap, or attachment will cause the pick operation to fail. This is why there are two high peaks in these areas.

As the void dimension increases, the profile shown in FIG. 7 flattens out near the damage index equals one level.

Rotation may have little or no effect if the shape is regular or with a small protruding lip. Rotation will have a greater effect as the protrusion gets larger because a large lip is more likely to catch in ATM transport guides.

In theory an MLP (multi-layer perceptron) is an ideal candidate for mapping the properties and sub-properties of the void/flap/attachment imperfections to the desired model of FIG. 7. However, despite the fact that a global approximation strategy would be best suited to implementing the majority of this function, the maximum damage index required at the vacuum pick points presents a problem. MLP architectures tend to smooth out such irregularities.

Fuzzy systems are good at mapping localized details but would have difficulty dealing with the large input dimension (eight properties and sub-properties) of this function.

To provide the advantages associated with each system, a composite system including an MLP ANN and fuzzy logic is used. The system uses fuzzy logic to correct (modify) the MLP output if an imperfection is in the vacuum pick areas as distinct from modeling these sections of the function independently. The amount by which the MLP must be adjusted depends on the level of threat posed by an imperfection, that is, to what extent the void/flap/attachment will compromise the vacuum pick seal areas and also the difference between the required output for a maximum threat (that is, damage index equals one) and the MLP's current output. For example if a void is a threat to some degree, then the correct damage index will lie somewhere between the current MLP output and one. The level of threat itself is related to the void's size and position relative to the vacuum pick areas.

As the size and position are the only properties needed to assess threat, and when the ambiguous nature of imperfection classification in general is taken into account, a fuzzy system is well suited to modeling this problem. As it does not have to consider the shape and rotation influence, its rule base will be much smaller than if a fuzzy system was used to implement the full, local feature mapping.

By combining the outputs of the MLP and the fuzzy system in an appropriate way it is possible to approximate the desired function of FIG. 7 The approximation can be developed and modified using both observational and explicit linguistic information in a manner which is much more efficient than alternative strategies.

Figure 8:
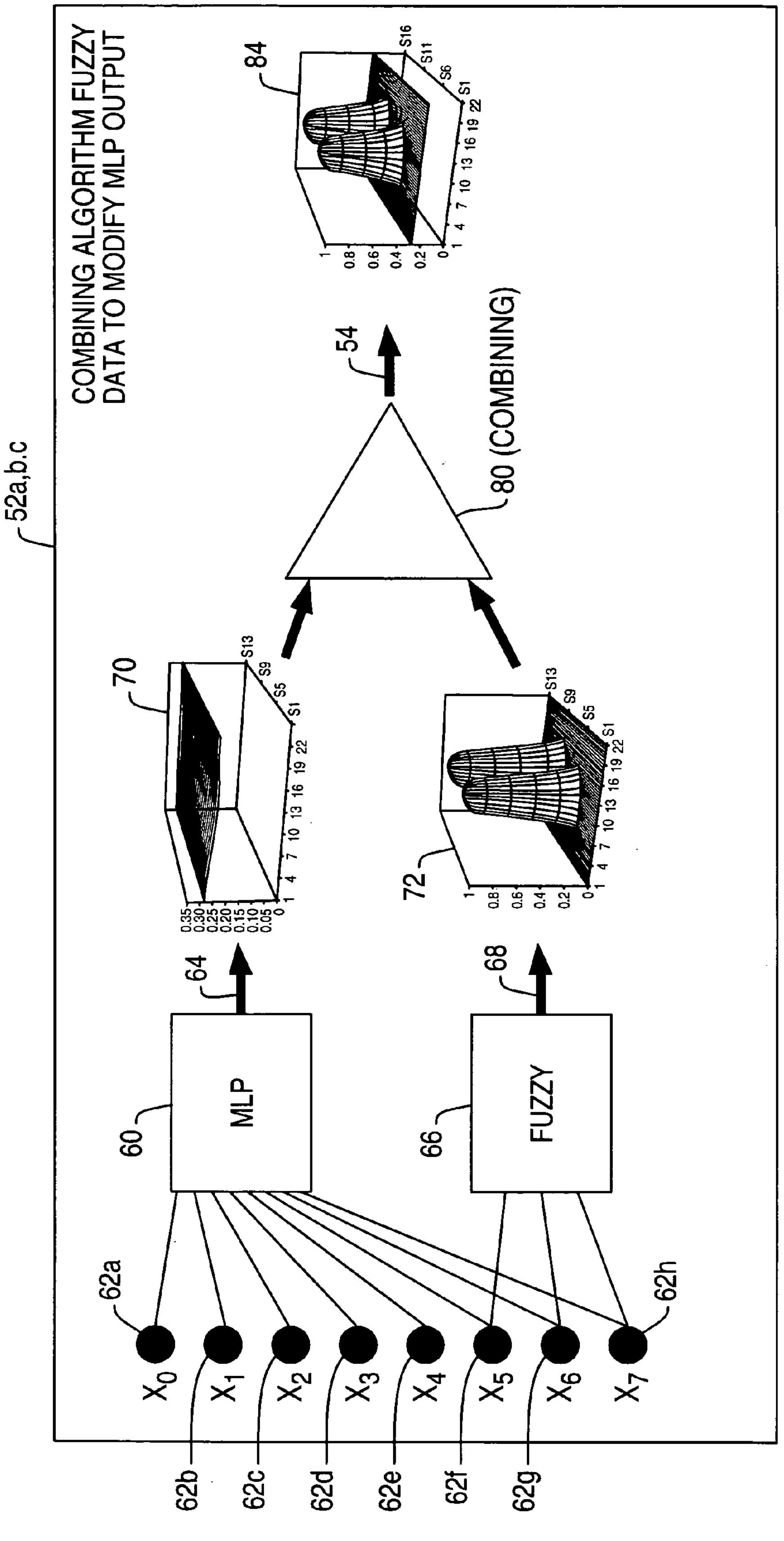
FIG. 8 illustrates the architecture of a module shown in FIG. 1 and the resulting mapping.

FIG. 8 illustrates the architecture of the first level computing classifiers 52*a,b,c*, which combine an MLP and fuzzy logic to generate a function similar to the function shown in FIG. 6. In FIG. 8, an MLP ANN 60 receives eight inputs (62*a* to 62*h*) and generates a single damage index output 64. The eight inputs are: regular shape 62*a*, small protruding lip shape 62*b*, medium protruding lip shape 62*c*, large protruding lip shape 62*d*, rotation 62*e*, dimension 62*f*, x location 62*g*, and y location 62*h*.

A fuzzy logic system 66 receives three inputs (dimension 62*f*, x location 62*g*, and y location 62*h*) and generates a single damage index output 68.

The MLP damage index output 64 relates to the entire area of the banknote (but is not accurate for the predefined critical areas corresponding to the areas that will be in contact with vacuum cups in an ATM dispenser), as illustrated by plot 70 in FIG. 8.

The fuzzy logic system damage output 68 relates solely to the critical areas corresponding to the areas that will be in contact with vacuum cups in an ATM dispenser, as illustrated by plot 72 in FIG. 8.

Combining means 80 (in the form of a combining module implementing an algorithm) operates on the two damage indices 64,68 and generates a single composite damage index 54, with a mapping as illustrated by plot 84 in FIG. 8.

Thus, the MLP module is responsible for the majority of the damage mapping. A fuzzy system is used to detect any specific instances of damage which the MLP is incapable of mapping fully. The fuzzy system cannot produce a damage index for these instances on its own. Instead a combining module considers both the MLP damage index and the level of threat recognized by the fuzzy system and makes a cumulative, overall damage assessment. Implementation of this architecture requires an MLP, fuzzy system and in particular a capable fusion algorithm.

The MLP must map the eight-dimensional input space to a single damage index output 64. There is one simplification that can be made to the shape input ranges. Each of these variables indicates to what degree an imperfection possesses some feature like a protruding lip or regularity. They are continuous in the interval [0,1] and the training set needed to encapsulate the function formed by these and the other parameters in the input space would be extensive. To overcome this, the values of the shape variables are restricted to a discrete set of points namely, 0.0, 0.25, 0.5, 0.75, and 1.0. Incoming shape values are rounded up or down to these reference points which greatly reduces the size of the original function and therefore the training set required for it. The rounding down process is based on the following (where SF is the shape feature):

$0.0 \leq SF \leq 0.125$ $0.125 < SF \leq 0.375$ $0.375 < SF \leq 0.625$ $0.625 < SF \leq 0.875$ $0.875 < SF \leq 1.0$ Although this simplification will result in some error it is an acceptable trade-off between accuracy and efficient training and implementation. In other embodiments, where greater accuracy is desirable, this simplification may not be used.

The fuzzy system must detect when an imperfection will cause a problem in the vacuum pick areas. The degree of threat posed by an imperfection depends on how close it is to the danger areas. In practice, this means the distance between the nearest fringe point of an imperfection to the threat sector boundaries. The information available to this system includes the imperfection centroid position and size, A term set for size is shown in FIG. 9*b*.

There are different methods of measuring the size. In this embodiment, the size referred to in FIG. 9*b* is not the area but rather the length of the axis which contains the longest number of imperfection co-ordinates. Equiangular sampling can be applied to data representing the shape of a void/flap/attachment to produce a measure of the distance between the centroid and points on the periphery. This represents the length of radii separated by a constant angle. If radii separated by 180° are joined to form a diameter measure, the longest of these can then be selected to represent the size of an imperfection for the threat assessment. By considering how close the centroid of an imperfection is to the danger areas, and also its furthest reach in the form of a size measurement, it is possible to estimate a worst case damage measure in the absence of detailed fringe point co-ordinate data.

Figure 10:
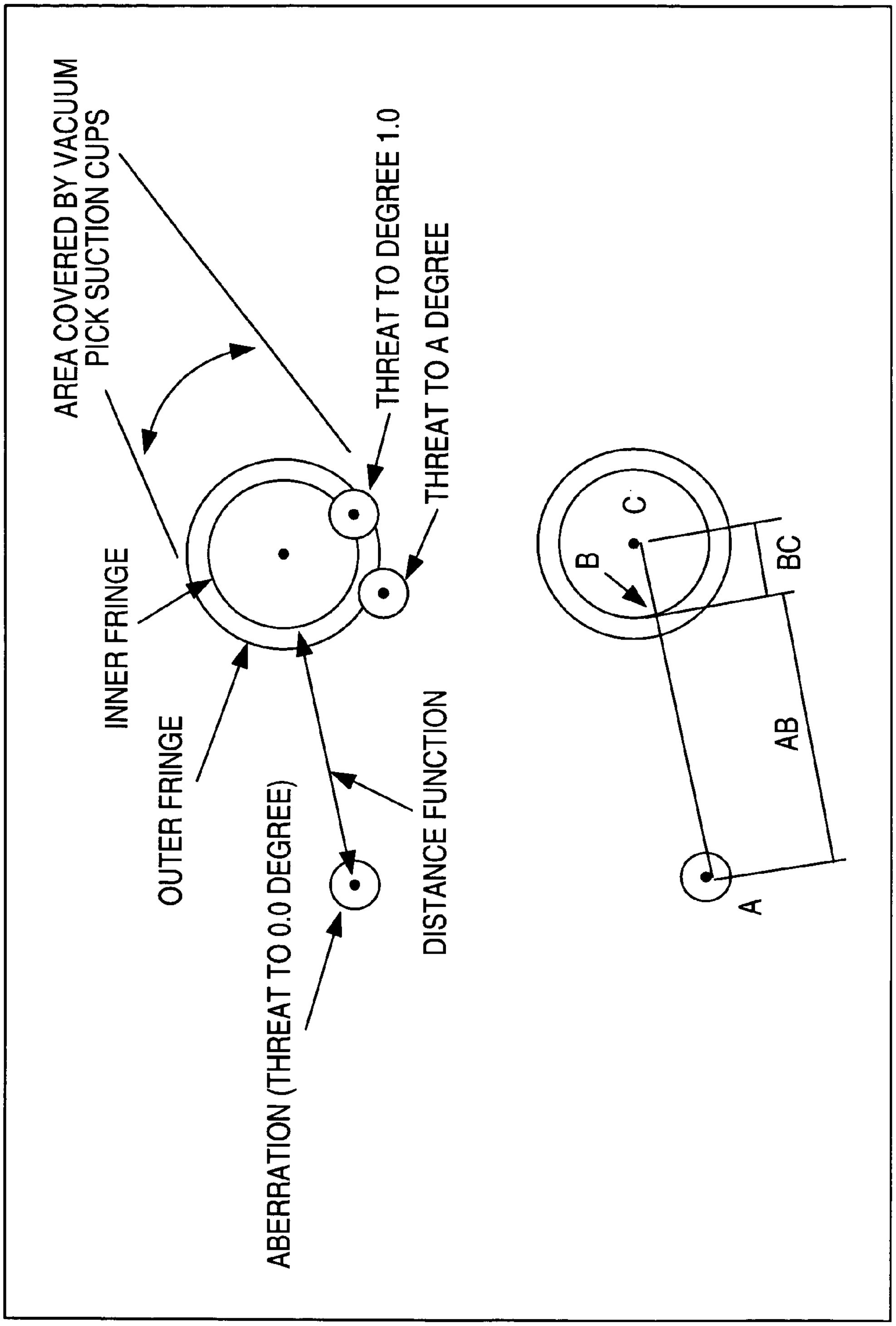
FIG. 10 shows the parameters involved in proximity estimation.

To estimate the proximity of imperfections to pick areas, it must be established whether the center of the imperfection is inside the inner fringe of the vacuum pick area. FIG. 10 illustrates the parameters involved in the proximity estimation.

This will be true if the length of the line segment AC in FIG. 10 is <=the radius of the inner fringe. As the points ($x_c$, $y_c$) and ($x_A$, $y_A$) are both known, the length of AC can be estimated directly using equation (1).

$$|AC| = \sqrt{(x_A - x_C)^2 + (y_A - y_C)^2} \quad (1)$$

Figure 11:
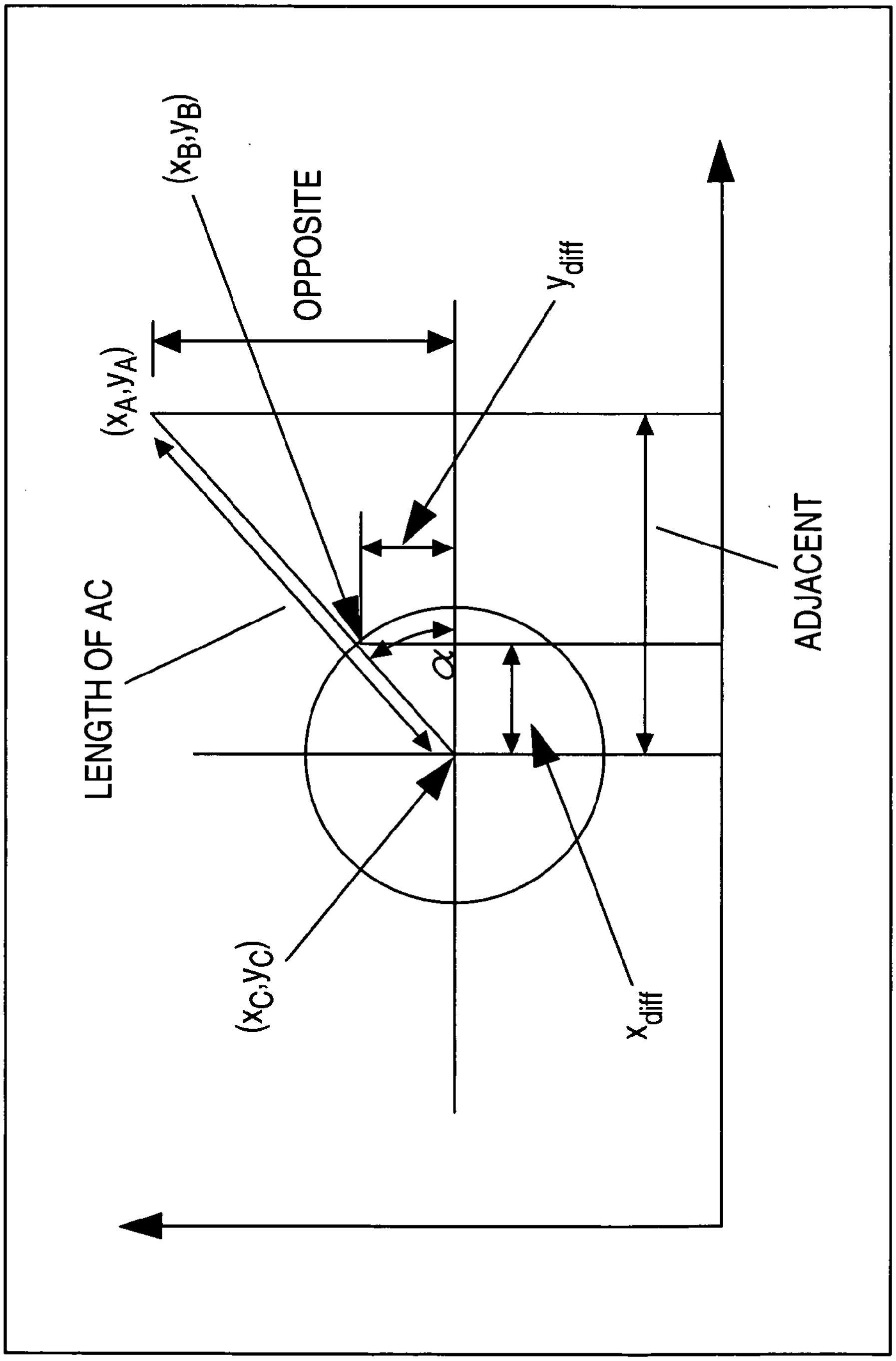
FIG. 11 illustrates calculation of co-ordinates for the parameters of FIG. 10.

Secondly, if this is not the case then the distance from the imperfection center to inner fringe must be calculated. This is equal to the length of the line segment AB. Point B is where a line drawn between the center of the imperfection and the vacuum pick area intersects with the inner fringe as shown in FIG. 10. As B is unknown it must first be found. Using A and C and equations (2) and (3), the tan of the angle □ can be calculated. This can be used in equation (4) to find □ itself.

$$\text{Tan}(\ ) = \text{Opposite/Adjacent} \quad (2)$$

where the opposite and adjacent are as shown in FIG. 11 and are equal to the differences between (x,y) co-ordinates for the points A and C. This gives equation (3).

$$\text{Tan}(\alpha) = \frac{(y_A - y_C)}{(x_A - x_C)} \quad (3)$$

where special conditions apply to prevent divide by 0 errors, namely:

$$\alpha = \left\{ \begin{array}{ll} 90^\circ & \text{if } x_A = x_C \text{ AND } y_A > y_C \\ 270^\circ & \text{if } x_A = x_C \text{ AND } y_A < y_C \end{array} \right\}$$

else $$\square = \tan^{-1}(\text{equation 3 Result}) \quad (4)$$

Point B co-ordinates can be found with equations (5) and (6):

$$x_B = x_C + x_{diff} \quad (5)$$

$$y_B = y_C + y_{diff} \quad (6)$$

$x_{diff}$ and $y_{diff}$ can be found using equations (7) and (8)

$$x_{diff} = R \cdot \text{Cos}(\square) \cdot cf \quad (7)$$

$$y_{diff} = R \cdot \text{Sin}(\square) \cdot cf \quad (8)$$

where R is the radius of the circle formed by the inner fringe and cf is a correction factor defined as follows:

$$cf = \begin{cases} 1 & \text{if } x_A \geq x_C \\ -1 & \text{if } x_A < x_C \end{cases} \tag{9}$$

The proximity of an imperfection center to the inner fringe is given by the length of the line segment AB i.e.:

$$|AB| = \sqrt{(x_A - x_B)^2 + (y_A - y_B)^2} \tag{10}$$

Figure 9:
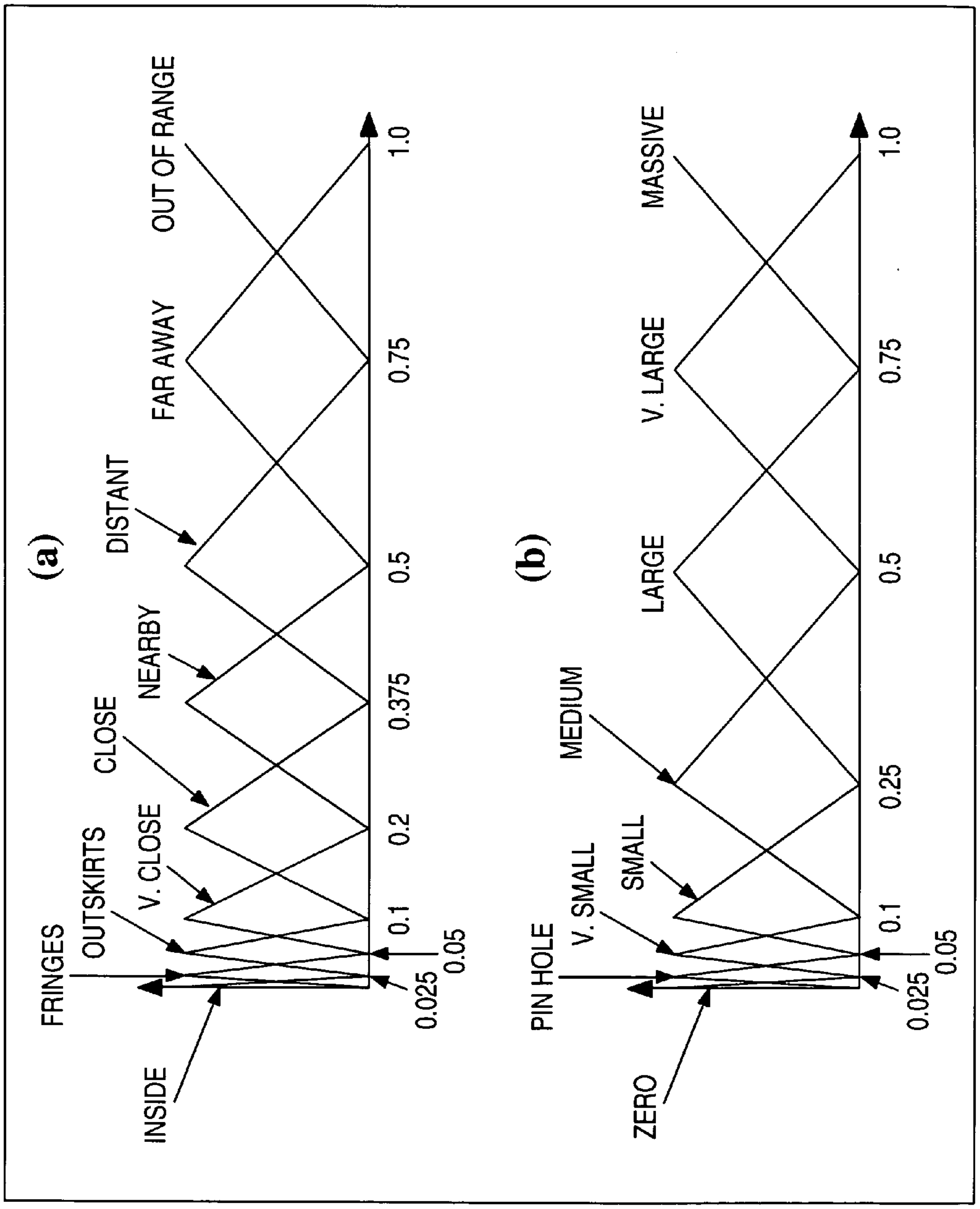
FIG. 9 shows fizzy logic term sets for size and proximity of an imperfection.

FIG. 9 also shows the term set for a proximity function. Proximity estimates how close the center of an imperfection, given by its x and y co-ordinates, is to the inner fringe of the vacuum pick danger area. A set of fuzzy logic rules can be derived to compute the degree of threat posed by an imperfection depending on its proximity to the pick areas and its size.

To fully implement the fuzzy systems required for the voids/tears/attachments, tears, and limpness modules, basis functions were needed to realize the input and output variable terms sets. B-splines were chosen over standard Gaussian functions as they make it easier to generate a fuzzy representation of the model from the MLFF (multi-layer feed forward) network. Furthermore they are easy to evaluate and provide strictly local support for the membership functions which is desirable for terms set efficiency and interpretation (see Brown M. & Harris C. 1995, "A perspective and critique of adaptive neurofuzzy systems used for modeling and control applications", International Journal of Neural Systems, Vol. 6, No. 2 pp.1997–220).

B-spline basis functions are piecewise polynomials given by the following term recurrence relationship:

$$N_k^j(x) = \left(\frac{x - \lambda_{j-k}}{\lambda_{j-1} - \lambda_{j-k}}\right) \cdot N_{k-1}^{j-1}(x) + \left(\frac{\lambda_j - x}{\lambda_j - \lambda_{j-k+1}}\right) N_{k-1}^j(x) \tag{11}$$

$$N_1^j(x) = \begin{cases} 1 & \text{if } x \in I_j \\ 0 & \text{otherwise} \end{cases} \tag{12}$$

Also $$I_j = [\lambda_{j-1}, \lambda_j) \tag{13}$$

where $N_k^j(\cdot)$ is the $j^{th}$ univariate basis function of order k. $\lambda_j$ is the $j^{th}$ knot and $I_j$ is the $j^{th}$ interval.

Figure 12:
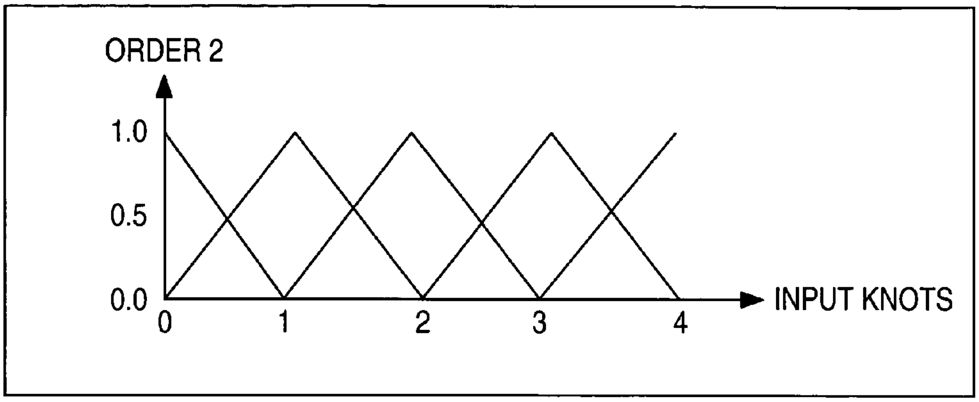
FIG. 12 shows order 2 B-spline fuzzy membership functions.

FIG. 12 shows B-splines of order k=2. It can be seen that the knots represent piecewise polynomial intervals and from these, univariate basis functions are formed, which can characterize fuzzy term sets with varying degrees of smoothness.

Multivariate membership functions $\mu_{A'}(x)$ which form the fuzzy rule antecedents can be created using equation (4).

$$\mu_{A'}(x) = \prod_{j=1}^{n} N_{k_j}^{i_j}(x_j) \tag{14}$$

where n is the number of univariate functions in the antecedent and $N_k^i$ represents the index to the fuzzy set defined on $x_j$ which contributes to the $i^{th}$ multivariate set (Bossely K. M. 1997 "Neurofuzzy modeling approaches in system identification", Ph.D. thesis, University of Southampton).

The fuzzy system 66 is implemented by a hybrid neuro-fuzzy architecture using B-spline basis functions for fuzzy sets. The weight coding algorithm used to represent the rule outputs in the architecture was based on equation (15):

$$w_i = \sum_j c_{ij} y_j^c \text{ where} \tag{15}$$

$$\sum_j c_{ij} = 1 \tag{16}$$

and where $y_j^c$ is the center of the $j^{th}$ fuzzy output set (see Nauck D., Klawonn F., Kruse R., 1997,"Foundations of neuro-fuzzy systems", Wiley, ISBN 0-471-97151-0).

The combining module 80 (FIG. 8) will now be described. The purpose of the combining module 80 is to ensure that the fuzzy system is used to correctly adjust the MLP damage index output 64 so that it takes account of the vacuum pick threat. The MLP output 64 will be valid provided there are no threats posed by imperfections present on a banknote. However once an imperfection becomes a threat to any degree, output 64 must be changed to the appropriate value.

If an imperfection is not a threat in any way, then the MLP is capable of mapping the function accurately. If the imperfection is a complete threat then the critical damage value of DI=1.0 must be applied regardless of the MLP's output 64. If the imperfection is a threat to degree (that is, $0.0 < \text{threat} \leqq 1.0$) then both the critical value and the MLP output 64 must be used to derive the required value. Equation (17) implements this fusion process:

$$y_{app}(x) = y_{mlp}(x) + \alpha_{threat} \cdot (y_{crit} - y_{mlp}(x)) \tag{17}$$

where $y_{app}(x)$ is the output of the combining module 80, $y_{mlp}(x)$ is the MLP output 64, $y_{crit}(x)$ is the damage index required for maximum threat (in this embodiment it is 1.0), and $\alpha_{threat}$ is the threat posed by an imperfection, which is the fuzzy logic damage index output 68.

Using this system is equivalent to opening up the neural network black box and making adjustments so that it responds to particular localized situations in a pre-defined way. Furthermore, this can be done directly as opposed to requiring a lengthy training process, where a successful outcome is not always guaranteed.

The MLP modules in the first level computing classifiers 52*a,b,c* must be trained. There are eight inputs to the MLP. Four shape feature parameters are valid in the range [0.0, 1.0]. Dimension, Rotation, Lx & Ly inputs were normalized. In theory, this is not necessary for an MLP, but in practice it makes weight initialization easier. This is because the input ranges are in the order of unity and the weight ranges therefore are expected to be in a similar scale. If normalization is not carried out, there is a danger that the network will saturate and cease to learn should there be large degrees of scale between inputs. In this case appropriate weights must be chosen to counteract this which can lengthen the training process.

The training patterns within training sets may be re-organized in a random fashion to help prevent the learning process getting stuck in local minima. Learning may be carried out using the backpropagation (BP) with momentum algorithm.

To help reduce the complexity of the learning problem, training data may be transformed using techniques described with reference to FIGS. 13 to 19, and described below.

Figure 13:
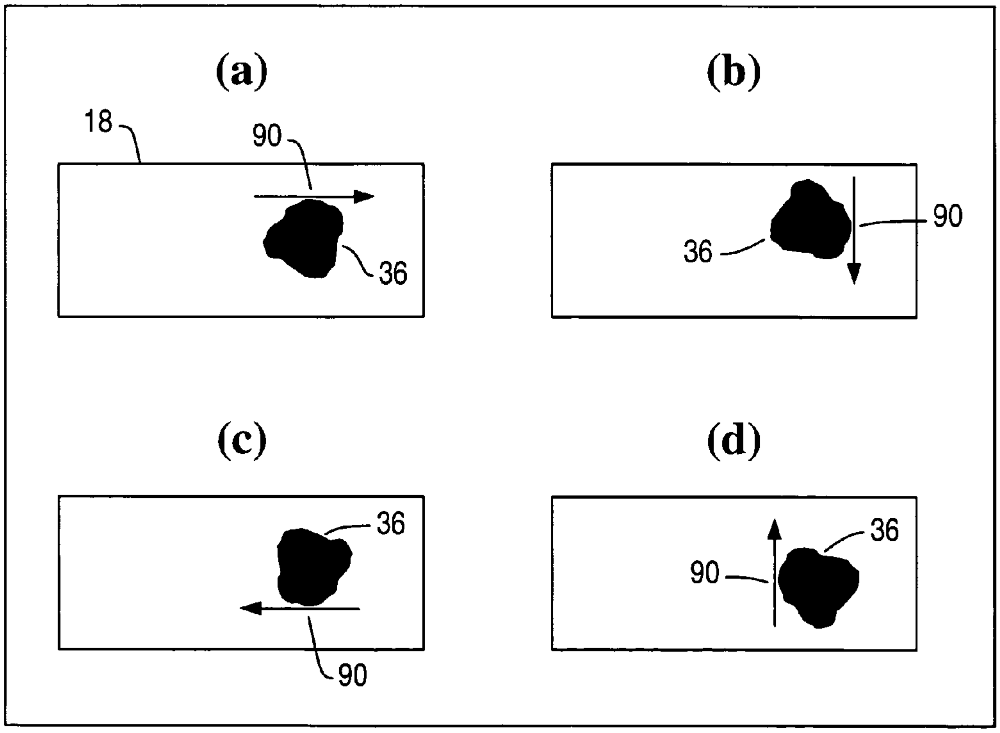
FIG. 13 illustrates an imperfection in four different angular rotations.

There are a number of imperfection types for which changes in rotation have little or no effect such as the regular shaped void 36 on banknote 18 in FIG. 13, where the direction of travel is indicated by arrow 90. However for certain SF (shape feature) types, such as large protruding lip, the rotation does make a strong contribution to the damage estimate.

Figure 14:
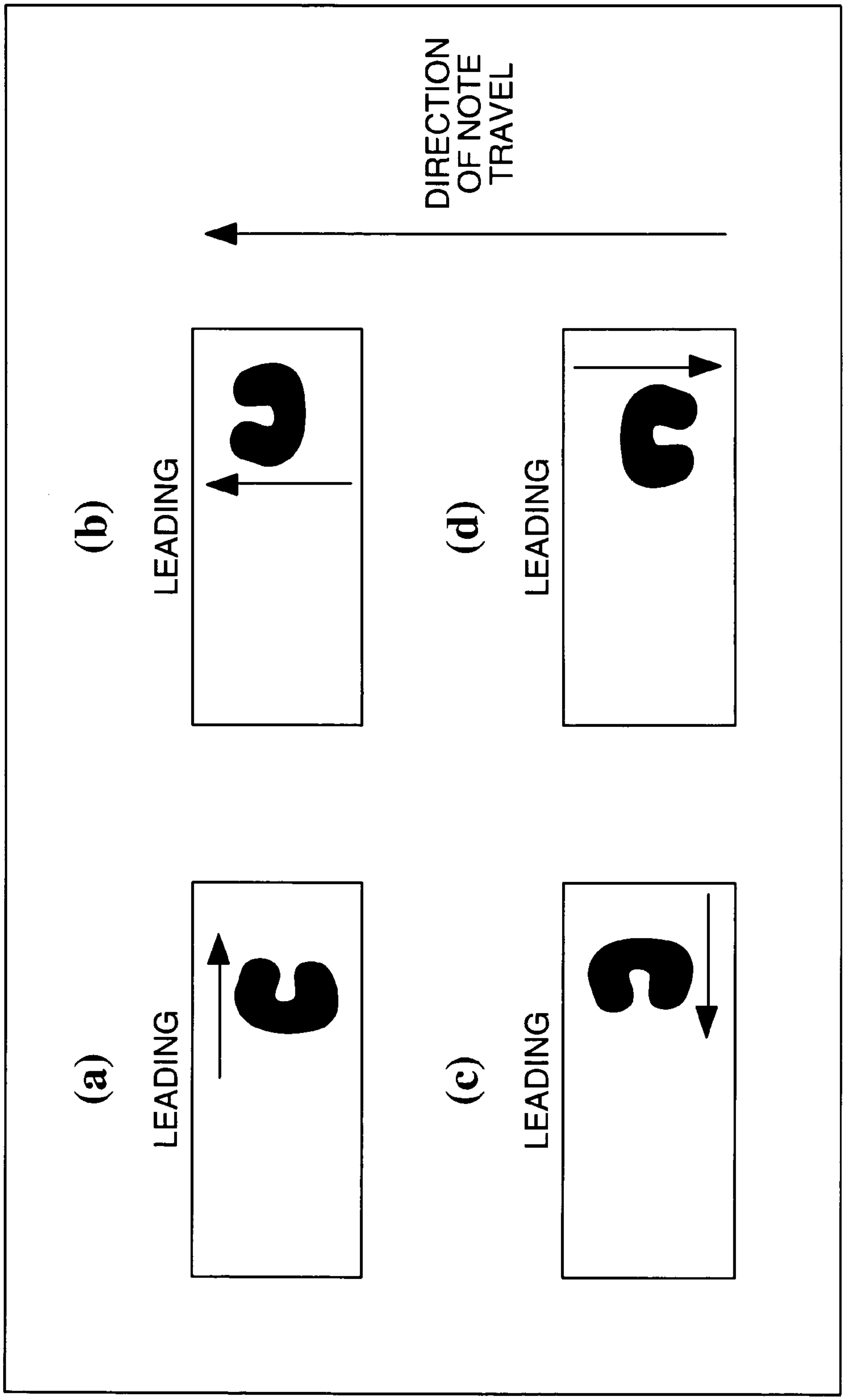
FIG. 14 illustrates another imperfection in four different angular rotations
Figure 15:
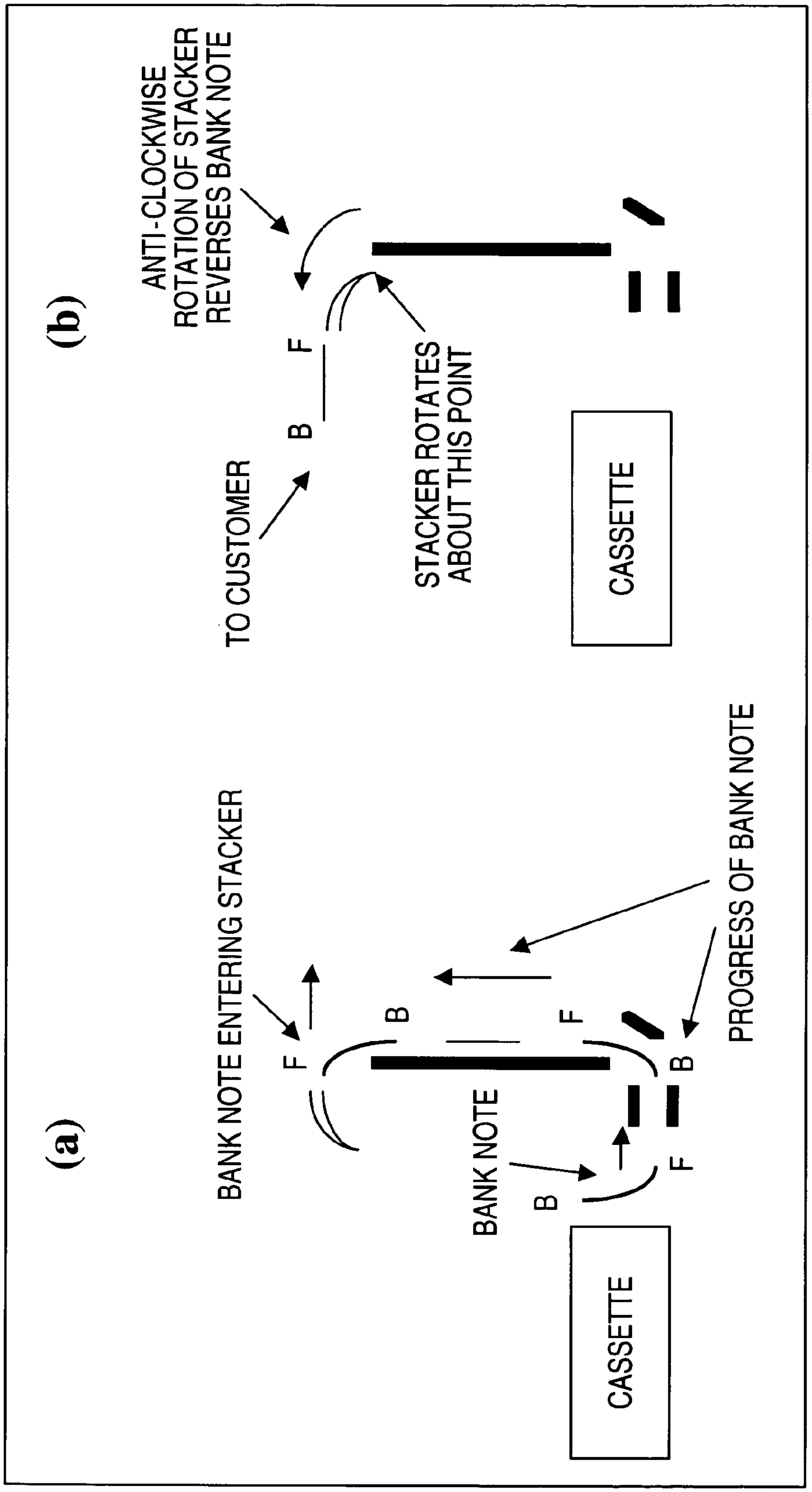
FIG. 15 illustrates various positions of a bank note as it is being picked from a cassette.

Consider the void 36 in FIG. 14. The void 36 rotated as in FIG. 14(*d*) is the most likely to cause damage as the lip is in a particularly prone position. The transport mechanism inside the ATM is such however, that banknotes can be flipped over in the course of transport. This is due to the effect of the note stacker device shown in FIG. 15, in which (a) shows a banknote after pick from a cassette, and (b) shows a banknote in final stages of transport; in FIG. 15, F=Front & B=Back of the banknote. As can be seen from FIG. 15, the initial leading edge of the bank note becomes the lagging edge by the time it exits the transport, that is, 'front' turns to 'rear'.

The imperfection in FIG. 14(*b*) will become forward facing so its damage index must be equivalent to that of FIG. 14(*d*). There is a symmetry therefore, about the 0°–180° axis, that is, the long edge of the banknote perpendicular to the direction of travel, because of this effect.

Figure 16:
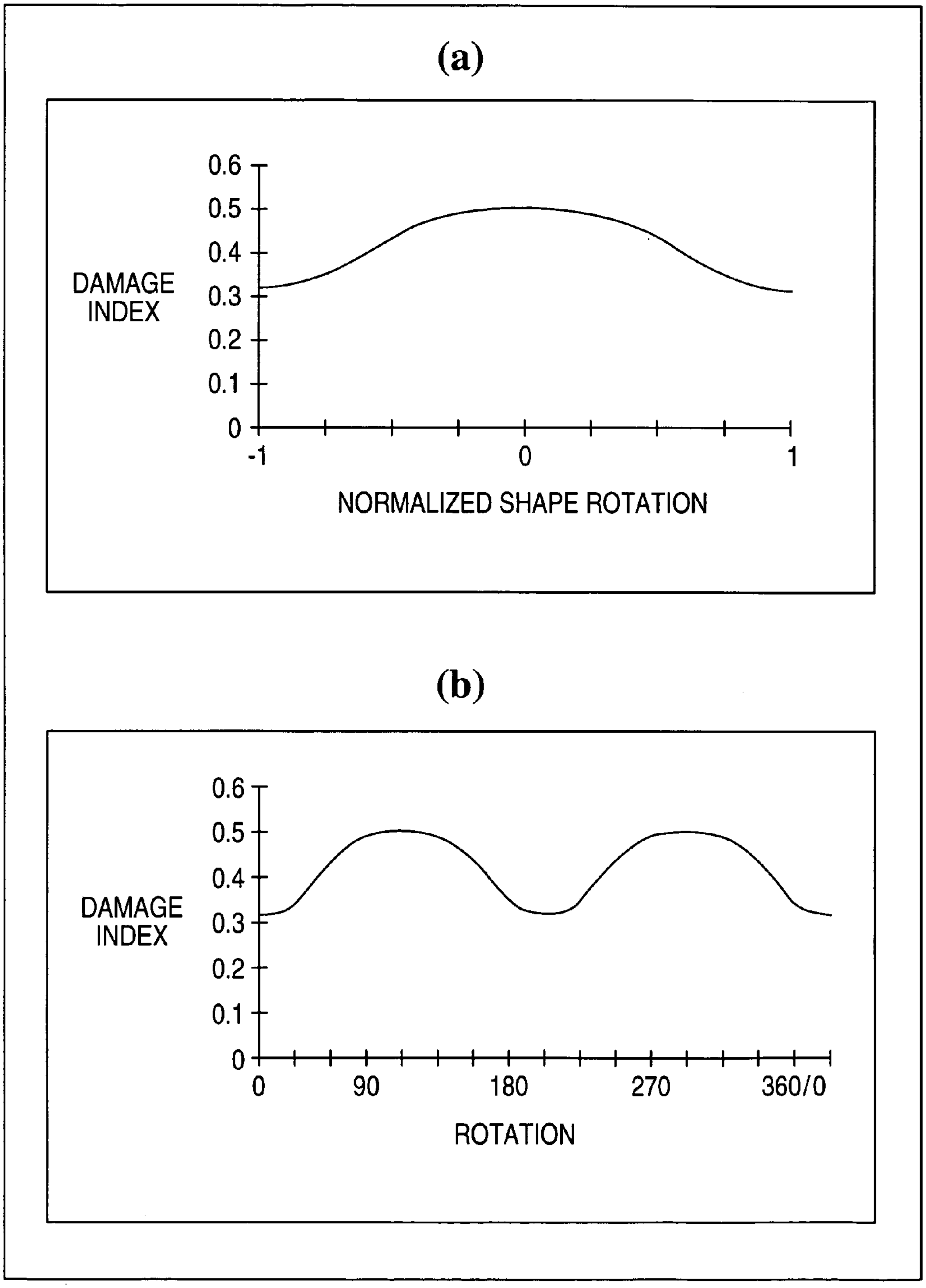
FIG. 16 is two graphs illustrating a previous and a new rotation coding scheme.

As a result of this, the damage indices of some rotations must be made equal, for example, 90° & 270°, 45° & 315°, and such like. This limits the range of the rotation variable to 0°–180°. By taking the cosine of an imperfection's SF (shape feature) rotation, its angle will be transformed into this range and the symmetry maintained. For example, Cos(45°)=Cos(315°) and vice versa. Rotation values are therefore re-coded using the cosine transformation and the range of input values is −1–+1. This feature transformation results in less complex mappings. For example, if the previous coding scheme, which simply used a normalized rotation angle, were used to map the damage for the shapes in FIG. 14, the result could be something like that shown in FIG. 16(*a*). FIG. 16(*b*) shows the equivalent mapping using the cosine transformation. When assigning damage to two symmetrical values the worst case and therefore the higher damage index is assumed.

The symmetry about a banknote's central long edge axis also has implications for the way damage is assigned based on position. As a banknote can be flipped over, there is no 'front' or 'back' in position terms so some locations will have the same damage assigned to them as FIG. 17(*a*) shows.

Figure 17:
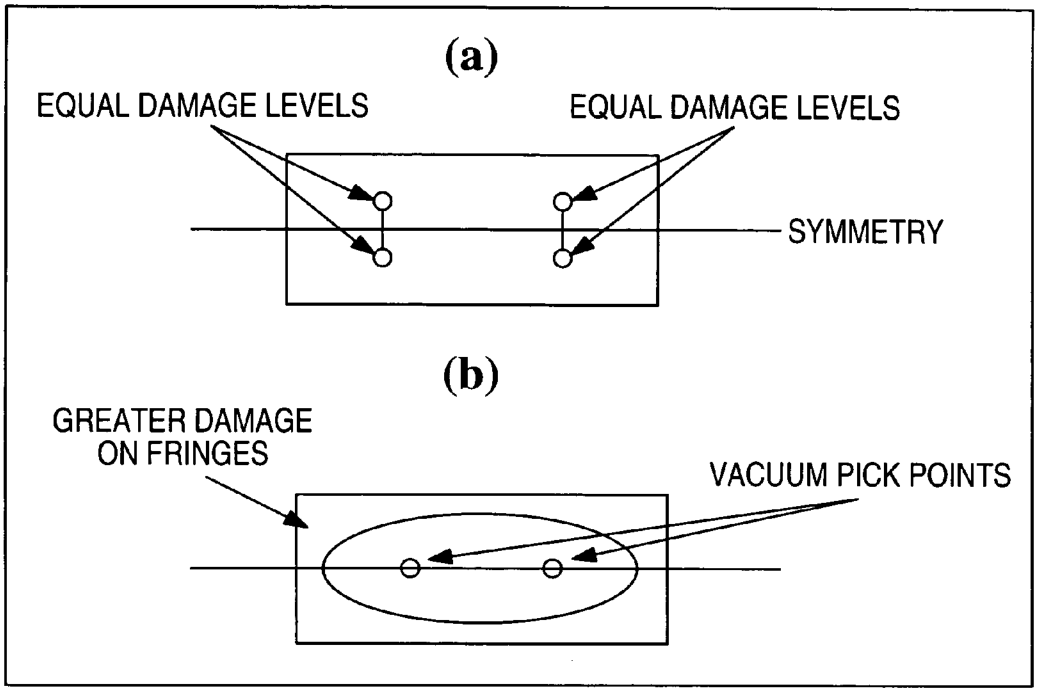
FIG. 17 illustrates damage symmetry due to position of an imperfection and a general damage profile for a banknote.

Damage is greater for those imperfections which are closer to the edges of a banknote, as FIG. 17(*b*) shows. Damage is also at a maximum if an imperfection is in a vacuum pick area. The transport mechanism of an ATM is itself symmetrical, however, a note may not enter in perfect alignment, that is, where its center is aligned with the center of the transport. There may be some slippage to the left or right as in FIG. 18(*a*).

Figure 18:
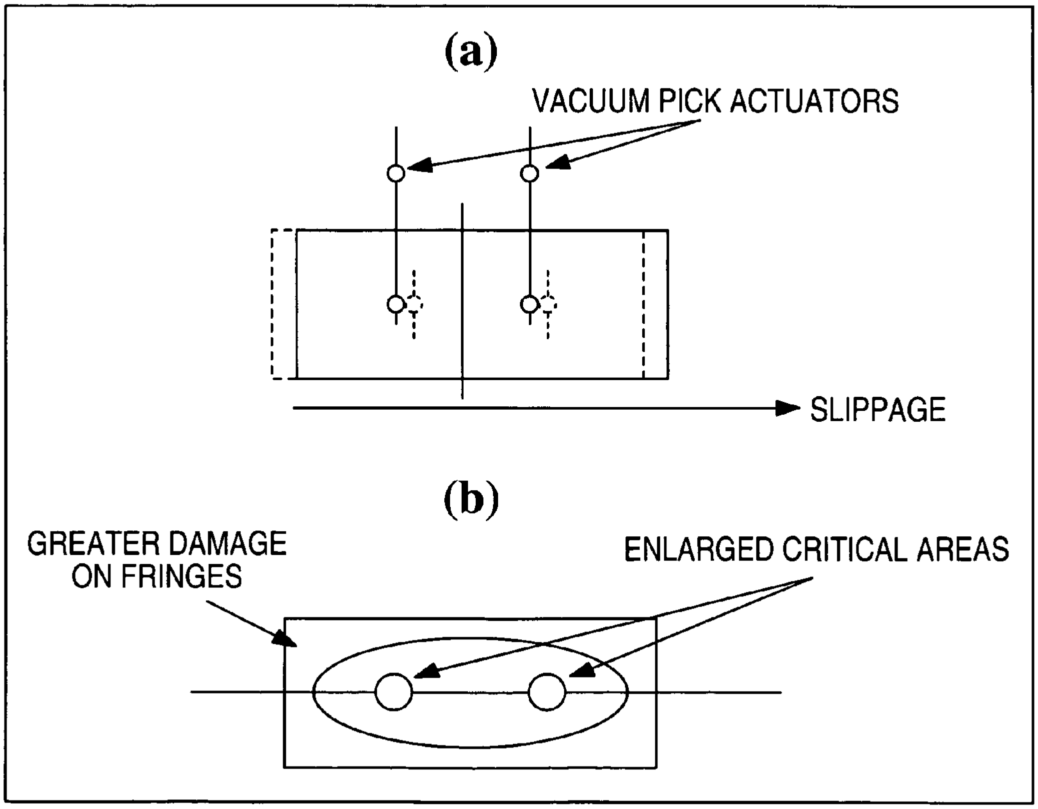
FIG. 18 illustrates the effect of banknote slippage on danger areas.

To cater for this, the danger area associated with position, particularly with respect to the vacuum pick areas, must be enlarged as FIG. 18(*b*) shows. As can be seen from FIG. 18(*b*), there is also symmetry about the short axis of the banknote and again, certain imperfections will share equivalent damage indices as a result. The transport form encountered by the 'top' of the banknote is the same as that experienced by the 'bottom' of the banknote. When the 'flip' effect of the note stacker is also taken into account, eight positions on a banknote will match in damage terms as FIG. 19 shows.

Figure 19:
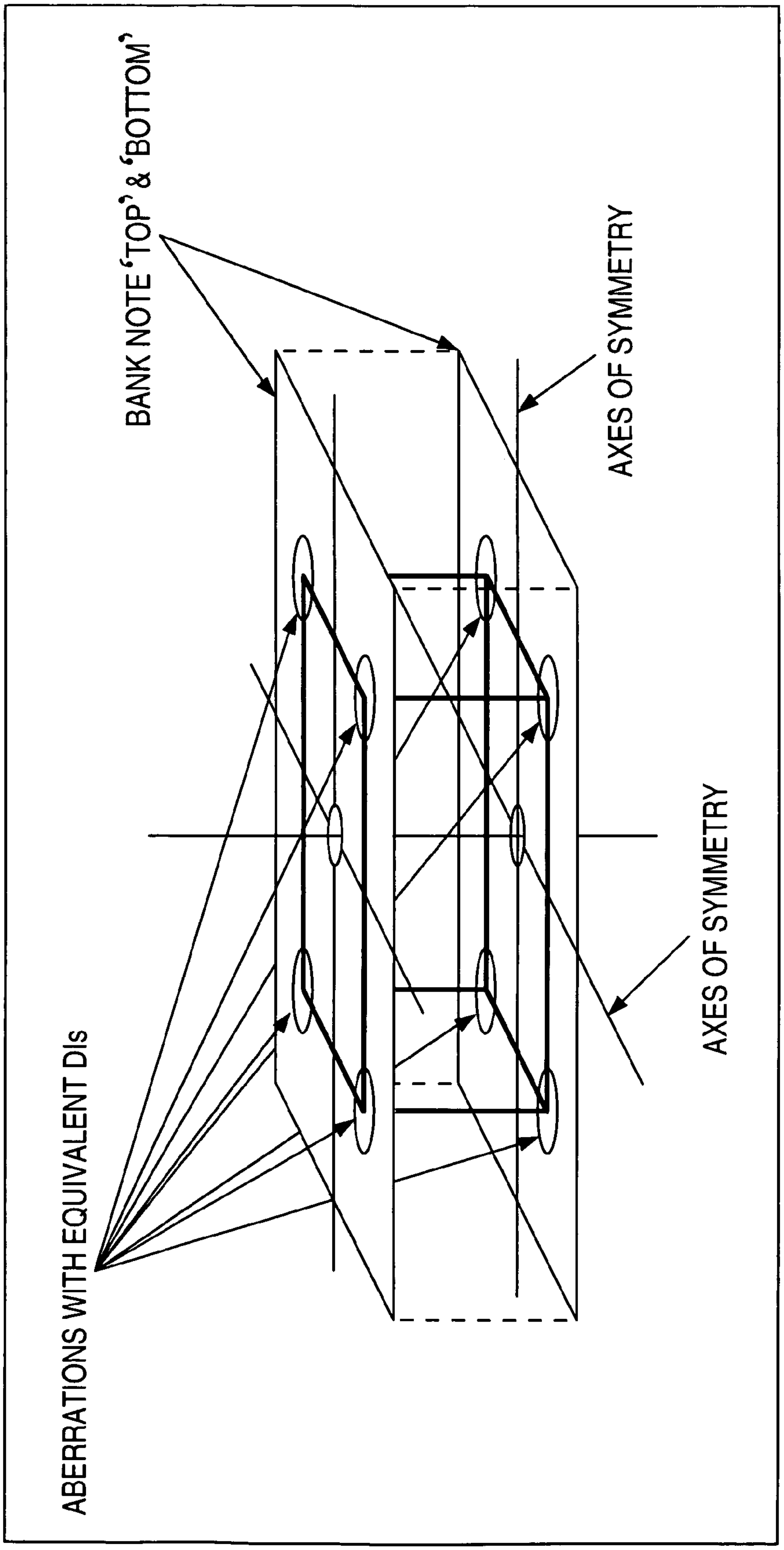
FIG. 19 illustrates equivalent imperfection positions on a banknote.

The cumulative effect of all of these invariances is that xyz co-ordinates in the banknote shown in FIG. 19 can be translated onto a single octant. Again this helps to simplify the overall mapping by effectively reducing the size of the input space. The Lx & Ly inputs to the MLP now receive normalized single octant co-ordinates.

The new transformation allows the MLP networks to be trained successfully. The translation invariance means that the fuzzy system only has to deal with a single vacuum pick position.

The second level computing classifier 56 (FIG. 3) combines the five outputs 54*a* to 54*e* from the first level classifiers 52*a* to 52*e* to produce a final suitability index 20 for the banknote 18. As with first level classifiers, the second level classifier must do so in a way which emulates, or can be modified to emulate, the way a trainer or bank expert would perform this function. Again, the suitability index 20 is a measure of how ATM unfit the banknote is, based on the expert's cumulative damage evaluations given the results from the first level computing classifiers 52.

A fuzzy system is intuitively appealing as a means of implementing such the second level classifier 56 because experts could specify relationships such as:

"If DI1 is Medium damage And DI2 is Small damage . . . THEN note is damaged Lots."

Figure 20:
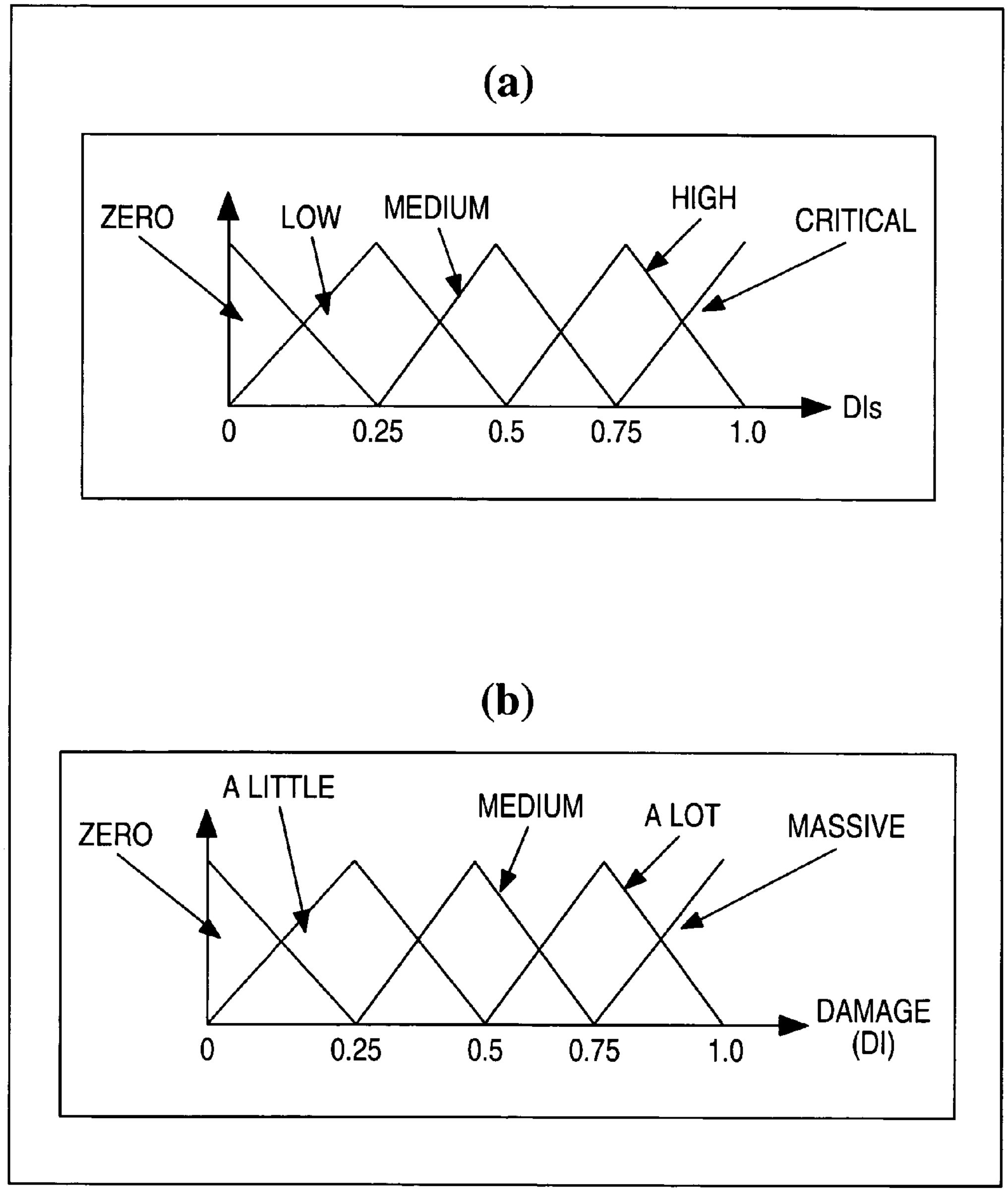
FIG. 20 shows a term set for consequent and antecedent parameters for the evaluation module of FIG. 3.

A problem exists however, in that five inputs (54*a* to 54*e*), each with a basic five member term set would require an expert to specify 3125 outputs for the complete rule base. This can however be reduced when the form of the rule base is examined more closely. From a classification point of view the type of imperfection to which the damage indices 54*a* to 54*e* are attributed is not important in this embodiment. This means that there is redundancy in the rule base (medium damage due to a tear and small damage due to a void will have the same suitability index as small damage due to a tear and medium damage due to a void) so an expert does not have to specify the full 3125 rules. A term set for the antecedent (b) and consequent (a) parameters is shown in FIG. 20.

The second level classifier 56 is also implemented by a hybrid neuro-fuzzy architecture using B-spline basis functions for fuzzy sets, where the weight coding algorithm used to represent the rule outputs in the architecture was again based on equations (15 and 16).

This provides a computationally efficient way of storing the rules. For example, the rule:

IF DI1 Zero & DI2 Zero & DI3 Zero & DI4 Sml & DI5 Sml THEN GDI is 0.35 actually represents IF DI1 Zero & DI2 Zero & DI3 Zero & DI4 Sml & DI5 Sml THEN GDI is 0.6 A_Little.

IF DI1 Zero & DI2 Zero & DI3 Zero & DI4 Sml & DI5 Sml THEN GDI is 0.4 Medium.

The second level classifier 56 receives the five outputs 54 from the first level classifier, applies the hybrid fuzzy-neural rules, and defuzzifies the result to produce a suitability index 20. This defuzzification may be implemented using a center of gravity technique, or any other convenient technique, for producing a crisp output.

Thus, the second level classifier 56 is a fuzzy system that performs the required task of evaluating banknotes by emulating the behavior of an expert rather than by modeling a process. Discrete inputs to the system (that is, outputs 54*a* to 54*e*) are first fuzzified and categorized. A set of fuzzy rules is then interrogated to produce an appropriate fuzzy output set. The output set is then defuzzified to produce a discrete output (the suitability index 20). An operator can decide whether to accept or reject this banknote based on the value of the suitability index. Alternatively, the banknote may be automatically accepted or reject based on the value of the suitability index As the classifiers used are based on fuzzy logic and neural networks, the classifiers can be trained to be more stringent or less stringent in accepting or rejecting notes.

One advantage of this system is that designers can make use of both observational and explicit representations of expert behavior in a complementary and direct way. MLP training is simplified and its implementation made more tractable by removing the localized features from the sub-function that the MLP has to approximate. This should also result in a more accurate mapping of the overall function as the MLP is able to concentrate on the parts it does best, that is, the high-dimensional smooth segment. In a similar way, the fuzzy system is only required to map a low-dimensional sub-function so its contribution is computationally efficient.

Another advantage of using fuzzy logic to model a localized threat is that rules can be specified explicitly by an expert, without requiring a long learning process as would be required for a neural network system.

This system can be used to model any type of function which has a large number of inputs, has a generally smooth topography, but also has small points of localized detail. For such functions, the system is particularly effective and is easy to initialize and adapt using either exemplar or explicit expert-specified data.

Thus, the system can model any function of this form not just damage on a bank note. It could be the location of knots in wood for plank classification. It doesn't have to be damage either. Any function which meet this description can be mapped and trained efficiently with this system.

In addition, any techniques which helps in the design of a fuzzy system such as additive modeling or clustering algorithms can be applied. Their contribution should be maximized as the complexity of the sub-function mapped by the fuzzy system is much less than the overall approximation.

Various modifications may be made to the above described embodiment within the scope of the invention, for example, in other embodiments, media other than banknotes may be used, such as tickets, coupons, passes, or such like. In other embodiments, the evaluation system may be used for evaluating media for devices other than ATMs or kiosks.

In other embodiments, different sensors may be used to detect each of these imperfections, and the three different types of imperfections may be treated differently. In other embodiments, different types of neural networks and/or different types of hybrid neural-fuzzy systems may be used than those described.

What is claimed is:

1. A computing machine implemented method of evaluating media, the method comprising the steps of:

sensing properties of media including the location of any imperfection in the media;

evaluating any imperfections in one or more predefined critical locations on the media;

generating a first damage value based on the imperfections in the critical locations;

evaluating any imperfections in any non-critical locations on the media;

generating a second damage value based on the imperfections in the non-critical locations; and combining the first and second damage values to generate a single damage index.

2. A computing machine implemented evaluation module for coupling to a sensing arrangement, the evaluation module comprising:

a classifier including first evaluating means for evaluating any imperfections in one or more predefined critical locations on media and generating a first damage value, second evaluating means for evaluating any imperfections in any non-critical locations on the media and generating a second damage value, and combining means for combining the first and second damage values to generate a single damage index.

3. A computing machine implemented evaluation module according to claim 2, further comprising a number of classifiers, and a second level classifier for receiving the single damage index from each classifier and for generating a suitability index therefrom.

4. A computing machine implemented method of evaluating media, the method comprising the steps of:

sensing the media;

detecting one or more physical imperfections in the media;

determining properties of each of the imperfections in the media;

generating a damage index associated with each imperfection based on the determined properties; and generating a single suitability index based on a combination of each damage index.

5. A computing machine implemented method of evaluating media, the method comprising the steps of:

sensing the media;

detecting at least one physical imperfection in the media;

determining properties of each imperfection in the media;

generating a damage index associated with each imperfection based upon the determined properties of the imperfection; and generating a single suitability index based upon a combination of each damage index.

6. A computing machine implemented evaluation system for evaluating media, the system comprising:

sensing means for sensing properties of media including the location of any imperfection in the media; and an evaluation module for evaluating imperfections in the media, the evaluation module comprising an artificial neural network and a fuzzy system;

wherein the evaluation module includes a classifier including first evaluating means for evaluating any imperfections in one or more predefined critical locations on the media and generating a first damage value, second evaluating means for evaluating any imperfections in any non-critical locations on the media and generating a second damage value, and combining means for combining the first and second damage values to generate a single damage index.

7. A computing machine implemented evaluation system according to claim 6, wherein the first evaluating means comprises a fuzzy system, and the second evaluating means comprises an artificial neural network.

8. A computing machine implemented evaluation system according to claim 6, wherein the evaluation module includes a plurality of classifiers, and a second level classifier for receiving the single damage index from each classifier and for generating a suitability index therefrom.

9. A computing machine implemented evaluation module for evaluating imperfections in media, the evaluation module comprising:

a classifier including (i) a fuzzy system for evaluating any imperfections in one or more predefined critical locations on the media and generating a first damage value, (ii) an artificial neural network for evaluating any imperfections in any non-critical locations on the media and generating a second damage value, and (iii) combining means for combining the first and second damage values to generate a single damage index.

10. A computing machine implemented evaluation module according to claim 9, further comprising (i) another classifier, and (ii) a second level classifier for receiving the single damage index from each classifier and for generating a suitability index therefrom.

* * * * *